United States Patent Office

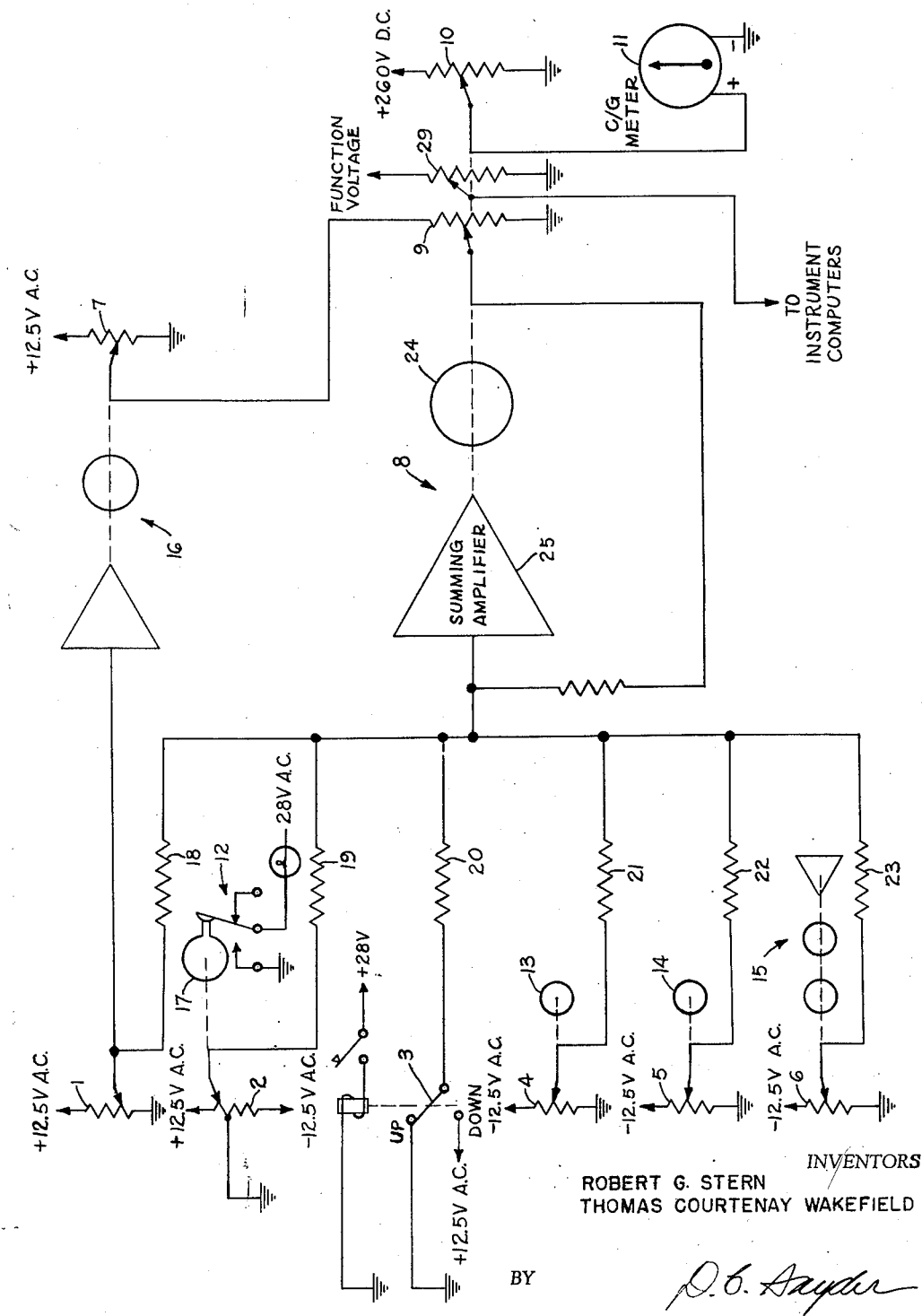

2,817,161
Patented Dec. 24, 1957

2,817,161

CENTER OF GRAVITY SYSTEM

Robert G. Stern, Caldwell, and Thomas Courtenay Wakefield, Denville, N. J., assignors, by mesne assignments, to the United States of America as represented by the Secretary of the Navy Application October 24, 1952, Serial No. 316,818

4 Claims. (Cl. 35—12)

This invention relates to training apparatus employed to instruct student pilots in the flight of aircraft and more particularly to improvements in means for simulating and indicating a change in aircraft center of gravity along the mean aerodynamic chord.

An important factor in the maintenance of steady flight in an aircraft is the distribution of weight as influenced by the depletion of fuel and ammunition, movements of the aircraft personnel, wing icing, shifting of the position of equipment, etc., in contingencies not always predictable by the pilot. Such changes often cause a shift of aircraft center of gravity along the mean aerodynamic chord which in turn affects the dynamic response of the aircraft to manipulation of the pilot's controls. The design and construction of an aircraft are directed towards optimum stability with provision for suitable controllability within the confines of safe operation for the aircraft structure involved. The effective center of gravity for any condition of loading is a factor with considerable influence over control characteristics, and, in order to provide satisfactory flight in a particular aircraft it is generally advisable to maintain the center of gravity within a predetermined percentage of the mean aerodynamic chord. Change of center of gravity affected by the aforementioned factors are indicated by variations in instrument readings on the pilot's instrument panel, and coupling between the center of gravity system of the trainer and the appropriate instruments is one of the functions of the computer sections.

As evidenced by the prior art, it has been the practice heretofore to accomplish the result of actuating the pilot's instruments in accordance with shifts in aircraft center of gravity through the use of motors operating in conjunction with mechanical equipment. An example of a disclosure illustrating this system is Patent Number 2,584,261 issued February 5, 1951 to R. C. Davis, et al.

It is the general object of the invention herein described to provide equipment and circuitry exemplifying an improved method of providing, in a flight trainer, visual indications of shift of simulated aircraft center of gravity as caused by expenditure of fuel and ammunition or manipulation of the landing gear or other similar equipment.

A further object of this invention is to provide a simulated center of gravity shift circuit responsive to control from the flight trainer instructor's position whereby the instructor at will may, within predetermined limits, introduce a shift in the center of gravity of the aircraft simulated by the trainer and subsequently observe the effect on the student pilot and his reaction thereto.

A further feature of this invention is the means of selective variations in indications presented by the pilot's instruments depending on the tendency of a change of simulated center of gravity to cause the aircraft to become nose heavy or tail heavy or otherwise dynamically unbalanced.

A further feature of this invention is the electronic control equipment which serves as a coupling link with the computers whose function it is to accurately deviate the pilot's instrument readings in conformance with simulated displacement of aircraft center of gravity.

Other objects and many of the attendant advantages of this invention will be readily appreciated as the same becomes better understood by reference to the following detailed description when considered in connection with the accompanying drawing wherein the center of gravity section of a flight trainer is depicted as illustrative of one embodiment of the invention herein disclosed. In the drawing, six of the factors which influence simulated center of gravity are shown as small alternating control voltages, of either positive or negative phase, directed to the input network of the summing amplifier of the simulated center of gravity servo system 8. These factors are as follows:

(a) The instructor's weight change control 1, located at the instructor's desk of the flight trainer, and by which he can, in setting up a flight problem for the pilot trainee, establish within limits the initial weight of the simulated aircraft.

(b) A center of gravity adjustment 2 also located at the instructor's desk, for initial setting of the simulated center of gravity in accordance with loading conditions and to the arm of which is mechanically coupled a cam 17 for actuating the switch 12 which flashes a warning light to indicate any setting of control potentiometer 2 outside the limits of compensation provided by the trim controls of the simulated aircraft.

(c) A relay-operated switch 3 provided to simulate the positioning of the landing gear of the aircraft.

(d) An inboard gun control 4, the arm of which is positioned in accordance with the rotation of inboard gun motor 13.

(e) An outboard gun control 5, the arm of which is positioned in accordance with the rotation of outboard gun motor 14.

(f) A fuel depletion control 6, the arm of which is varied in accordance with the rotation of the fuel depletion servo 15 which in turn is actuated by the fuel system of the trainer.

In the embodiment shown, each of the potentiometers 1, 2, 4, 5 and 6 and landing gear switch 3 is supplied with an A. C. voltage of positive or negative polarity depending upon whether a change in the particular potentiometer arm position is to change the simulated center of gravity to indicate an aircraft nose heavy condition or a tail heavy condition on the pilot's instruments. Each of these signal voltages is impressed upon the input network of the summing amplifier 25 contained in the center of gravity servo system 8. Additionally, since each of the inputs 1, 2, 3, 4, 5 and 6 simulates a weight, in order to represent a change in center of gravity as proportional to the product of this weight by its appropriate moment or distance from the initial center of gravity, fixed resistors 18, 19, 20, 21, 22 and 23, each valued in accordance with simulated distances, are included serially between inputs 1, 2, 3, 4, 5 and 6 and summing amplifier 25. The moment resistor 19 which is in series with the instructor's center of gravity change control 2, represents a weight of unity. Summing amplifier 25 of center of gravity servo system 8 combines the instantaneous voltages from inputs 1, 2, 3, 4, 5 and 6 and drives synchro motor 24, rotation of the shaft of which represents the net effect or simulated center of gravity produced by the six factors. The output shaft of synchro motor 24 is mechanically connected to the arms of potentiometers 9, 10 and 29. Potentiometer 9 is provided with a reference voltage through potentiometer 7, the magnitude of which is determined by the position of the rotatable element of weight servo system 16, which in turn is governed by factors affecting total weight of the simulated aircraft. The voltage picked up by the arm of potentiometer 29 serves to actuate the instrument computers as well as any computers employed in determining the loading of the trainer controls. The arm of potentiometer 10 is employed to provide driving voltage for a center of gravity indicator meter 11 located at the instructor's desk.

It is of course apparent that other effects which might influence center of gravity may be simulated and introduced in a similar manner but their inclusion here is not considered essential to this disclosure.

Obviously many modifications and variations of the present invention are possible in the light of the above teachings. It is therefore to be understood that within the scope of the appended claims the invention may be practiced otherwise than as specifically described.

What is claimed is:

1. A device to simulate voltages that represent the variations of the center of gravity of an aircraft comprising a means to generate a voltage that represents the aircraft weight, a second means to generate a voltage that represents the initial setting of the simulated center of gravity, a plurality of additional voltage varying means to represent variations of weight that occur during flight conditions, a summing amplifier connected to receive the outputs of said voltage generating means and said voltage varying means, orientation means connected to the output of said amplifier, and impedances coupled to said orientation means to provide a voltage that represents the center of gravity modified in accordance with the variations in the input voltages applied to said amplifier.

2. A device to simulate aircraft center of gravity variations comprising a voltage varying means that represents the aircraft weight, a second voltage varying means that represents the initial setting of the simulated center of gravity, a plurality of additional voltage varying means to represent variations of weight that occur during flight conditions, a summing amplifier connected to receive the outputs of said voltage varying means, indicator means connected to said second mentioned voltage varying means to designate extreme unbalanced conditions, means to continuously vary one of said plurality of additional voltage varying means to represent variations of fuel supply, orientation means connected to the output of said summing amplifier, and impedances coupled to said orientation means to provide voltages that vary in accordance with variations in the center of gravity as governed by the inputs to said amplifier.

3. A device to simulate aircraft center of gravity variations comprising an impedance that is variable in accordance with changes in simulated aircraft weight, a second impedance that is variable to represent a selected initial center of gravity setting, voltage means to represent the change in the center of gravity that is due to a change of landing gear position, a third impedance variable to represent changes in the simulated fuel supply, a summing amplifier connected to receive the outputs of said variable impedances and said voltage means, a servo system connected to the output of said summing amplifier, means connected to said first mentioned variable impedance to generate a reference voltage for said servo system, and a plurality of variable impedances connected to said servo system to generate voltages that represents the instantaneous center of gravity position of the simulated aircraft.

4. A device to simulate aircraft center of gravity variations comprising a first potentiometer to generate a voltage that represents aircraft weight, a second potentiometer to generate a voltage that represents the initial setting of the simulated center of gravity, a plurality of additional potentiometers to represent changes in weight effected during flight, a summing amplifier connected to said potentiometers, orientation means connected to the output of said amplifier, and voltage varying means coupled to said orientation means to provide a voltage that represents center of gravity modified in accordance with the variations in the input voltages applied to said amplifier.

References Cited in the file of this patent

UNITED STATES PATENTS

| | | |
|---|---|---|
| 2,443,098 | Dean | June 8, 1948 |
| 2,529,468 | Dehmel | Nov. 7, 1950 |
| 2,541,429 | Mathes et al. | Feb. 13, 1951 |
| 2,584,261 | Davis et al. | Feb. 5, 1952 |
| 2,628,434 | Dehmel | Feb. 17, 1953 |
| 2,687,580 | Dehmel | Aug. 31, 1954 |